US00RE49150E

(19) United States
(12) Reissued Patent
Grindstaff

(10) Patent Number: US RE49,150 E
(45) Date of Reissued Patent: Jul. 26, 2022

(54) MOTION IMAGERY CORNER POINT SEQUENCER

(71) Applicant: Intergraph Corporation, Madison, AL (US)

(72) Inventor: Gene Arthur Grindstaff, Huntsville, AL (US)

(73) Assignee: Intergraph Corporation, Madison, AL (US)

(21) Appl. No.: 17/103,348

(22) Filed: Nov. 24, 2020

Related U.S. Patent Documents

Reissue of:

(64) Patent No.: 10,140,693
Issued: Nov. 27, 2018
Appl. No.: 15/466,993
Filed: Mar. 23, 2017

(51) Int. Cl.

| | |
|---|---|
| ***G06T 5/00*** | (2006.01) |
| ***G06K 9/46*** | (2006.01) |
| ***G06V 10/44*** | (2022.01) |
| ***G06T 3/00*** | (2006.01) |
| ***G06T 17/05*** | (2011.01) |

(52) U.S. Cl.
CPC ..... *G06T 5/006* (2013.01); *G06T 3/00* (2013.01); *G06T 17/05* (2013.01); *G06V 10/44* (2022.01); *G06T 2207/10032* (2013.01)

(58) Field of Classification Search
CPC ..... G06T 5/006; G06T 3/00; G06T 17/05; G06T 2207/10032; G06V 10/44
See application file for complete search history.

(56) References Cited

U.S. PATENT DOCUMENTS 5,307,449 A * 4/1994 Kelley ..... G06T 15/83 345/419
5,319,744 A * 6/1994 Kelly ..... G06T 3/00 345/427
5,544,294 A * 8/1996 Cho ..... G06T 3/403 345/426
5,794,004 A * 8/1998 Rossin ..... G06T 11/40 345/620

(Continued)

FOREIGN PATENT DOCUMENTS

WO WO 2009/065003 A1 5/2009

OTHER PUBLICATIONS

Stack Overflow, "Sort Four Points in Clockwise Order", Oct. 31, 2018, 8 pages.*

(Continued)

*Primary Examiner* — Colin M Larose
(74) *Attorney, Agent, or Firm* — Nutter McClennen & Fish LLP

(57) ABSTRACT

A computer-implemented method for ordering vertices in an image frame within a data stream, wherein the image frame corresponds to Earth-viewing data. A point of intersection of a primary pair of lines is determined and loaded into computer memory, and interrogated as to a sign of a signed remainder with respect to each of two secondary lines defined by the pairwise ordered sets of vertices. In the case of opposite remainder sign with respect to the two secondary lines, two provisional indices are swapped to obtain a rectified index for each of the four vertices. The process is repeated with respect to the signed remainder of the intersection point of the secondary lines relative to the primary lines. The four vertices are then fit, in accordance with index ordering, into a tiling of the surface of the Earth based on the rectified index of each of the four vertices.

8 Claims, 6 Drawing Sheets

(56) References Cited

U.S. PATENT DOCUMENTS

| | | | | |
|---|---|---|---|---|
| 6,947,610 | B2 * | 9/2005 | Sun | G06T 3/00 353/69 |
| 7,379,619 | B2 * | 5/2008 | Ikeda | G06T 3/00 358/3.26 |
| 9,489,595 | B2 * | 11/2016 | Shen | G06K 9/6217 |
| 2005/0073532 | A1 | 4/2005 | Scott et al. | |
| 2005/0179688 | A1 * | 8/2005 | Chernichenko | G06T 5/006 345/427 |
| 2009/0225180 | A1 * | 9/2009 | Maruyama | G06T 5/006 348/222.1 |
| 2010/0283853 | A1 * | 11/2010 | Acree | G01C 11/00 348/144 |
| 2011/0090399 | A1 * | 4/2011 | Whitaker | H04N 21/4307 348/500 |
| 2012/0133840 | A1 * | 5/2012 | Shirasuka | H04B 7/08 348/732 |
| 2015/0262343 | A1 * | 9/2015 | Lee | G06T 5/006 348/148 |
| 2016/0180501 | A1 * | 6/2016 | Mallet | G06T 3/0018 382/164 |
| 2016/0314563 | A1 * | 10/2016 | Wang | G06T 5/006 |
| 2016/0350966 | A1 * | 12/2016 | Nilsson | G06T 15/405 |
| 2017/0169573 | A1 * | 6/2017 | Ren | G06T 7/408 |
| 2017/0217589 | A1 * | 8/2017 | Maekawa | B64C 39/024 |
| 2017/0294002 | A1 * | 10/2017 | Jia | G06T 5/006 |

OTHER PUBLICATIONS

Anonymous, "Complexity of Untwisting Polygons," *Internet Archive WayBacalachine*, 2 pages [URL: http//web.archive.org/web/20141112090256/http://mathoverflow.net/questions/181492/complexity-of-untwisting-polygons].

Java™, "Class Polygon", Overview Package, *Java™ Platform, Standard Ed*. 6, 13 pages (2011).

Kalay, "Determining the Spatial Containment of a Point in General Polyhedra," *Computer Graphics and Image Processing*, vol. 19, pp. 303-334 (1982).

Motion Imagery Standards Board (MISB), Standard—UAS Datalink Local Set, MISB ST 0601.8, dated Oct. 23, 2014, 155 pages.

Stack overflow, "Sort Four Points in Clockwise Order," 8 pages (Oct. 2008) [http://stackoverflow.com/questions/242404/sort-four-points-in-clockwise-order].

Stack overflow, "Find whether point is inside a triangle (2D)," 1 page (Sep. 2012) [http://stackoverflow.com/questions/12583127/find-whether-point-is-inside-a-triangle-2d].

Stack overflow, "Find whether a point lies inside a rectangle or not,"7 pages (Sep. 12, 2015) [http://web.archive.org/web/20150912191852/http://stackoverflow.com/questions/2752725/finding-whether-a-point-lies-inside-a-rectangle-or-not].

International Searching Authority [EPO], International Search Report—International Application No. PCT/US2018/022302, dated Jun. 4, 2018, together with the Written Opinion of the International Searching Authority, 18 pages.

Federal Emergency Management Agency ("FEMA"), Guidelines and Specifications for Flood Hazard Mapping Partners, Appendix A: Guidance for Aerial Mapping and Surveying, *Map Modernization Federal Emergency Management Agency*, 57 pages (Apr. 2003).

Ahmed et al., Bar 1-Visibility Representation of Optimal 1-Planar Graph, *2013 International Conference on Electrical Information and Communication Technology* (*EICT*), pp. 1-5 (Feb. 2014).

* cited by examiner

MOTION IMAGERY CORNER POINT SEQUENCER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue of U.S. Pat. No. 10,140,693, which issued from U.S. patent application Ser. No. 15/466,993 filed on Mar. 23, 2017.*

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to computer processing of Earth images, and, more particularly, to rectifying quadrilateral-bounded images that have become corrupted and unusable in the course of computer processing.

BACKGROUND ART

In order to render Earth imagery data interoperable among a multitude of systems and users, the Motion Imagery Standards Board (MISB) has prescribed a standard format for transmitting and storing images of the Earth derived from down-looking cameras of various sorts at all wavelengths. MISB Standards are summarized in the Motion Imagery Standards Profile, MISP-2015.1: Motion Imagery Handbook (MISB, 2015), which may be accessed at http://www.gwg.nga.mil/, and which is incorporated herein by reference, and may serve, as a normative reference, and where terms might otherwise be ambiguous, for definition of terms as used herein. MISB Standard 0601, in particular, details the Unmanned Air System (UAS) Datalink Local Set (LS) for UAS platforms. MISB Standard 0601 incorporates NITF Standards document MIL-STD-2500C of the National Imagery Transmission Format (NITF), which is also incorporated herein by reference.

MISB standards apply to any type of imaging data, such as Visible Light, Infrared, LIDAR cloud, RADAR return, Acoustical, or any type of data, from any type of modality, as do all of the teachings of the present invention.

Corner points (synonymously referred to herein as "vertices") are transmitted as metadata (tags 26-33, according to the NITF standard cited above) within packets encapsulating motion imagery obtained from an airborne platform. The ordering of identified vertices of frames of imaging data may become corrupted during various stages of transmission or processing, but must accord with MISB standards for correct projection of imaging data onto Earth coordinates. While there are various ways to detect irregularities in the orientation of frame vertices and to correct them, some of which are routinely practiced, in order for images at any facet of the processing stream to be useful, irregularities in the orientation of frame vertices must be efficiently detected and cured. Since video frames occur at a high rate, it is necessary to detect and correct such irregularities rapidly. A new and particularly efficient method for detecting and curing such irregularities is provided herein, in accordance with embodiments of the present invention as taught below.

SUMMARY OF EMBODIMENTS OF THE PRESENT INVENTION

In accordance with an embodiment of the present invention, a computer-implemented method is provided for ordering vertices in a stream of image frames encapsulating Earth-viewing data. The computer-implemented method has steps of:

a. receiving in the stream of image frames, an image frame including four vertices of a terrestrial area, acquired by a rectangular optical sensor at an image plane of a remote sensing camera;

b. assigning a provisional index to each of the four vertices;

c. establishing a first point of intersection of primary lines defined by pairwise ordered sets of vertices;

d. loading the first point of intersection into computer memory;

e. interrogating the first point of intersection as to a sign of a signed remainder with respect to each of two secondary lines defined by the pairwise ordered sets of vertices;

f. in the case of opposite remainder sign with respect to the two secondary lines, swapping a first and a second of the provisional indices to obtain a rectified index for each of the four vertices;

g. establishing a second point of intersection of primary lines defined by pairwise ordered sets of vertices;

h. loading the second point of intersection into computer memory;

i. interrogating the second point of intersection as to a sign of a signed remainder with respect to each of the two primary lines defined by the pairwise ordered sets of vertices;

j. in the case of opposite remainder sign with respect to the two primary lines, swapping a second and a third of the provisional indices to obtain a rectified index for each of the four vertices, and otherwise using the provisional index of each of the four vertices as the rectified index of each of the four vertices; and k. fitting the four vertices into a tiling of the surface of the Earth based on the rectified indices of each of the four vertices.

In accordance with other embodiments of the present invention, the optical sensor of the remote sensing camera may include a rectangular array of pixels. Assigning a provisional index may include assigning vertex indices as received at a specified stage of processing the data stream.

In further embodiments of the invention, establishing a point of intersection of primary lines may include simultaneous solution of two linear equations, with each linear equation characterizing a line passing through a distinct pair of vertices. Assigning a provisional index may include assigning vertex indices as received at a specified stage of processing the data stream.

In accordance with another aspect of the invention, a computer program product is provided for ordering vertices in a stream of image frames encapsulating Earth-viewing data. The computer program product has a non-transitory computer-readable medium on which are stored computer instructions such that, when executed by a processor, the instructions cause the processor to:

a. receive, in the stream of image frames, an image frame including four vertices of a terrestrial area, acquired by an optical sensor at an image plane of a remote sensing camera;

b. assign a provisional index to each of the four vertices;

c. establish a first point of intersection of primary lines defined by pairwise ordered sets of vertices;

d. load the first point of intersection into computer memory;

e. interrogate the first point of intersection as to a sign of a signed remainder with respect to each of two secondary lines defined by the pairwise ordered sets of vertices;

f. in the case of opposite remainder sign with respect to the two secondary lines, swap a first and a second of the provisional indices to obtain a rectified index for each of the four vertices;

g. establish a second point of intersection of primary lines defined by pairwise ordered sets of vertices;

h. load the second point of intersection into computer memory;

i. interrogate the second point of intersection as to a sign of a signed remainder with respect to each of the two primary lines defined by the pairwise ordered sets of vertices;

j. in the case of opposite remainder sign with respect to the two primary lines, swap a second and a third of the provisional indices to obtain a rectified index for each of the four vertices, and otherwise use the provisional index of each of the four vertices as the rectified index of each of the four vertices; and k. fit the four vertices into a tiling of the surface of the Earth based on the rectified indices of each of the four vertices.

In accordance with other embodiments of the present invention, the optical sensor of the remote sensing camera may include a rectangular array of pixels. Assigning a provisional index may include assigning vertex indices as received at a specified stage of processing the data stream.

In further embodiments of the invention, establishing a point of intersection of primary lines may include simultaneous solution of two linear equations, with each linear equation characterizing a line passing through a distinct pair of vertices. Assigning a provisional index may include assigning vertex indices as received at a specified stage of processing the data stream.

BRIEF DESCRIPTION OF THE DRAWINGS

The invention will be more fully understood by referring to the following Detailed Description of Specific Embodiments in conjunction with the Drawings, of which:

FIG. 1 appears as FIG. 7-3 of MISB Standard 0601.

DETAILED DESCRIPTION OF SPECIFIC EMBODIMENTS

Definitions. The term "image" shall refer to any multidimensional representation, whether in tangible or otherwise perceptible form, or otherwise, wherein a value (scalar or otherwise) of some characteristic (amplitude, intensity, etc.) is associated with each of a plurality of locations (or, vectors in a Euclidean space, typically $\mathbb{R}^2$ or $\mathbb{R}^3$) corresponding to dimensional coordinates of an object in physical space, though not necessarily mapped one-to-one thereonto. Thus, for example, the graphical display of the spatial distribution of some field, either scalar or vectorial, such as brightness or color, constitutes an image. So, also, does an array of numbers, such as a 2D or 3D holographic dataset, in a computer memory or holographic medium. Similarly, "imaging" refers to the rendering of a stated physical characteristic in terms of one or more images.

The verb "rectify," as used herein and in any appended claims, shall denote bringing data into conformity with specified standards. The word "correct" may be used synonymously with the word "rectify."

The term "index" refers to an ordered numbering of elements of a set, and, more particularly, in the present context, to an ordered numbering of corner points of a polygon.

The term "vertex" shall be used synonymously with "corner point" to represent one of the set of points where segments defining the external edges of a polygonal image intersect pairwise.

A "corner point sequencer" receives a description of the locations of corner points and tests their order to establish whether they correctly correspond to corners of a polygon bounding an image, and, if not, orders the corner points correctly.

Figure 1:
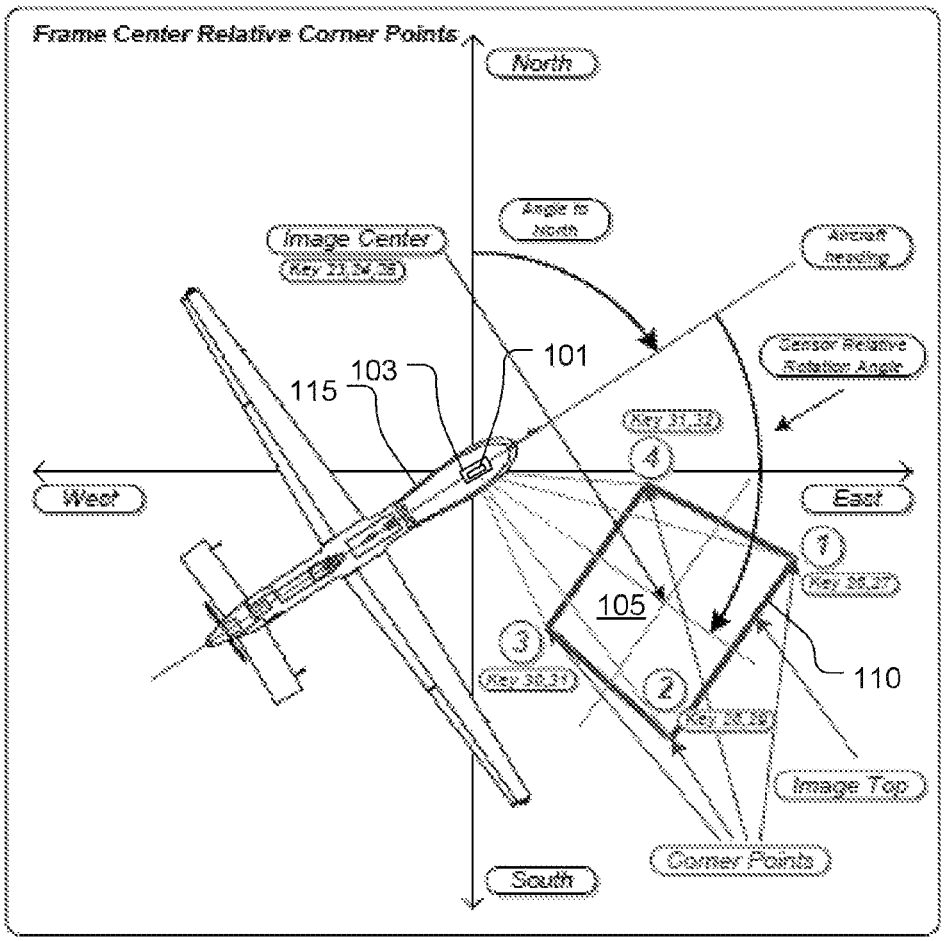
PRIOR ART Fig. 1
FIG. 1 depicts numbered corner coordinates in a rectangle imaged onto a rectangular sensor aboard an Earth-viewing platform.

Referring to FIG. 1, Earth imagery data are routinely acquired by a down-looking sensor (or "sensor") 101 aboard an Earth-viewing platform 115, such as an unmanned aerial vehicle (UAV), for example. Sensor 101 is disposed in an image plane of a remote sensing camera 103, and typically provides imagery data in the format of a rectangular array of pixels, which are processed and transmitted for analysis or dissemination. Due to the viewing angle of the sensor relative to Earth, the area projected onto rectangular sensor 101 is bounded by a quadrilateral 105, with angles that are no longer right angles but that are transformed by virtue of the slanted viewing angle. In order to process quadrilateral 105 for viewing or analysis in Earth-based coordinates, MISB Standard 0601 requires ordering of corner points (otherwise referred to herein as "vertices") 1, 2, 3 and 4 of each quadrilateral 105, as the data appear in any stage of transmission or processing, in a clockwise order. Thus, the vertices must be associated with indices that increment in the specified order and sense. Conformance to the standard is required in order to properly render images in the Earth frame, allowing projection onto a map of video from an Earth-viewing vehicle 115 using telemetry data derived from sensor 101 aboard the Earth-viewing vehicle.

Figure 2:
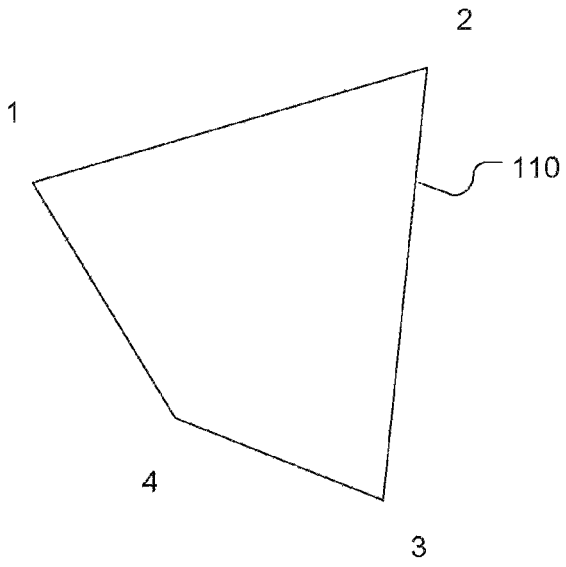
FIG. 2 shows the ordering of corner points of a quadrilateral outlining a captured image in accordance with the standards of MISB 0601.
Figure 3A:
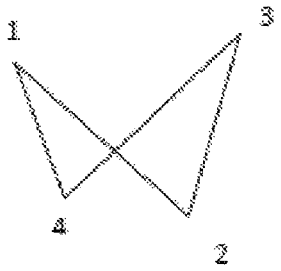
FIGS. 3A and 3B show two variant misorderings of corner points.
Figure 3B:
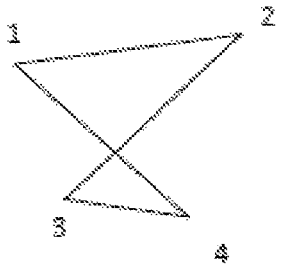

Quadrilateral 105, shown in FIG. 2, represents the projection of an image derived by sensor 101 onto the Earth frame. Each side 110 of quadrilateral 105 corresponds to an edge of sensor 101. According to the MISB 0601 standard, corner points 1, 2, 3 and 4 are ordered clockwise from the upper left corner. However, the telemetry, or subsequent processing, is sometimes not ordered correctly, resulting in misordered corner points, as depicted in FIGS. 3A and 3B. The swapping of two points represents the most common case of incorrectly ordered corner points.

Vertex indices, as they are received at a specified stage of processing, or at any stage of processing, may be assigned as provisional indices corresponding to respective corner points, and then corrected, in accordance with teachings of the present invention.

Geometrical Terms Referring to a Quadrilateral:

As used herein, and in any appended claims, an "internal angle" (or "interior angle") is the angle formed by two adjacent sides of a quadrilateral if, and only if, a point within the angle is in the interior of the quadrilateral. A quadrilateral is "convex" if, and only if, no internal angle exceeds 180°. A quadrilateral shall be referred to herein as "normal" if it is convex and if no more than two of its interior angles are right angles.

Figure 4A:
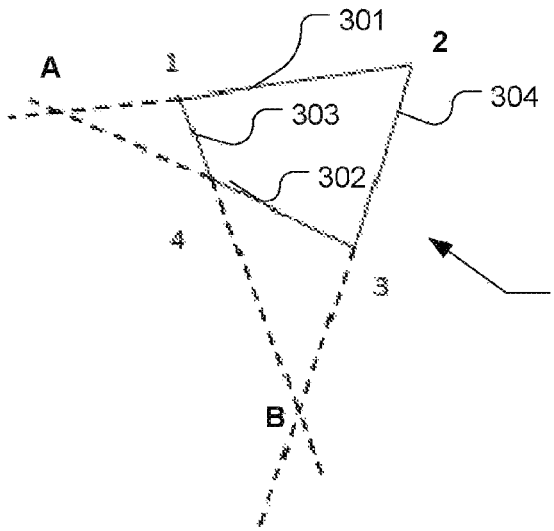
FIGS. 4A and 4B depict intersecting-line quadrilateral corner ordering in accordance with an embodiment of the present invention.

In accordance with embodiments of the present invention, a method is provided for detecting and correcting incorrectly ordered corner points, as now described. Referring to FIG. 4A, a top line 301 passes through points 1 and 2. Once a Cartesian reference frame has been specified, "top" refers to the line segment that passes though the point with the highest ordinate value and the next sequentially provisionally indexed point, in this case, points 1 and 2. Similarly, a bottom line 302 passes through points 3 and 4 (in the instance depicted in FIG. 4A). If top line 301 and bottom line 302 (jointly, "primary lines") intersect, their intersection is referred to as point A.

The term "primary lines," as used herein and in any appended claims, shall denote the lines passing through the pairs of corner points 1 and 2, and 3 and 4, respectively, as the points are provisionally indexed, as described above.

Lines passing through the pairs of corner points 1 and 2, 2 and 3, 3 and 4, and 4 and 1 are referred to herein as "bounding lines." If left and right lines 303 and 304 (jointly, "secondary lines") of quadrilateral 105 intersect, their intersection is denoted point B.

Figure 4B:
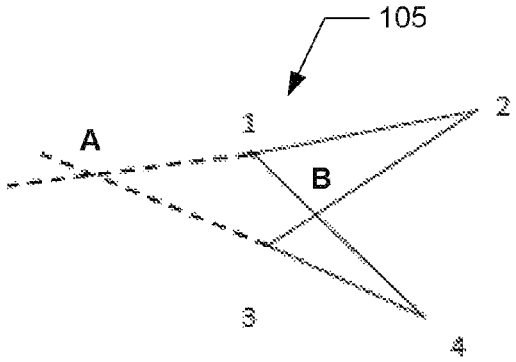

Swapping of two corner points 3 and 4, as depicted in FIG. 4B, as may occur through corruption of the data, generates a figure referred to herein as a "bowtie." The index of any corner point prior to rectification shall be referred to herein, and in any appended claims, as the "provisional index", while the index of any corner point subsequent to rectification shall be referred to herein, and in any appended claims, as the "rectified index" of that corner point.

If lines connecting corner points 1, 2, 3 and 4 divide the plane into a bounded region and an unbounded region, the unbounded region may be referred to herein as the "outside" of quadrilateral 105. It can be shown that in a "normal" quadrilateral (as defined above), both intersection points A and B lie outside quadrilateral 105, as shown in FIG. 4A. On the other hand, if one of the intersection points A and B does not lie outside quadrilateral 105, it shall be said to lie inside quadrilateral 105, as shown in FIG. 4B. Existence of a single intersection point B inside quadrilateral 105 is an indication that two of corner points 1, 2, 3 and 4 have been swapped, and that the corresponding indices must be exchanged in order to prevent the bowtie configuration of FIG. 4B.

In methods of the invention, each of the bounding lines 301, 302, 303 and 304 is cast in slope-intercept form (either homogeneous, or inhomogeneous):

$$y=m*x+b; \text{ or equivalently}$$

$$\text{Remainder}=m*x+b-y=0.$$

Simultaneous solution of the Top line 301 and Bottom line 302 lines yields their common intersection point A, which is loaded into computer memory. The primary lines (as defined above) are tested first, in accordance with a preferred embodiment of the present invention. The coordinates (x, y) of the intersection point A are substituted into the equations of the remaining two lines (referred to as the "secondary" lines), Left line 303 and Right line 304. Mutatis mutandis, the intersection point B is loaded into computer memory, and subsequently substituted into the equations of top and bottom lines 301 and 302.

The term "Signed Remainder" is defined as the Remainder times the sign of the slope of a line, thus:

$$\text{Signed Remainder}=(m*x+b-y=0)\times\text{sgn}(m),$$

where sgn(m) is the sign of m.

If intersection point A lies on line 303, then the Signed Remainder is zero, and intersection point A is on line 303. If intersection point A lies above the line 303, and the slope m is positive, the Signed Remainder is negative. Whether the Signed Remainder is positive or negative shall be referred to herein, and in any appended claims, as the "sign" of the Signed Remainder, or the "remainder sign." Determining whether the sign of the signed remainder is positive or negative may be referred to herein as interrogating the point of intersection as to the sign of the remainder.

If intersection point A is below line 303, and the slope m is positive, the Signed Remainder is positive. If intersection point A is to the right of the line 303, and the slope is positive, the Signed Remainder is positive. If intersection point A is to the left of line 303, and the slope is positive, the Signed Remainder is negative. Thus, if the remainders of the two bounding lines 303 and 304 have opposite signs, the intersection point A lies inside the quadrilateral.

Otherwise, the intersection point A lies outside the quadrilateral. Opposite signs of the signed remainders for the two bounding lines 303 and 304 implies that two corner points 3 and 4 need to be swapped. If the top and bottom lines 301 and 302 intersect inside the quadrilateral 105, then either the corner points 1 and 3 (in FIG. 4B) on the left need to be swapped, or the points 2 and 4 on the right need to be swapped. If the left and right lines 303 and 304 intersect inside the quadrilateral 105, then the corner points on the top (1 and 2 in FIG. 4B) need to be swapped or the points on the bottom (3 and 4 in FIG. 4B) need to be swapped.

In cases where a bounding line is vertical (and its slope m is undefined), a distinct test is performed to determine whether the intersection of the corresponding primary (or secondary) line lies inside or outside quadrilateral 105.

Figure 5:
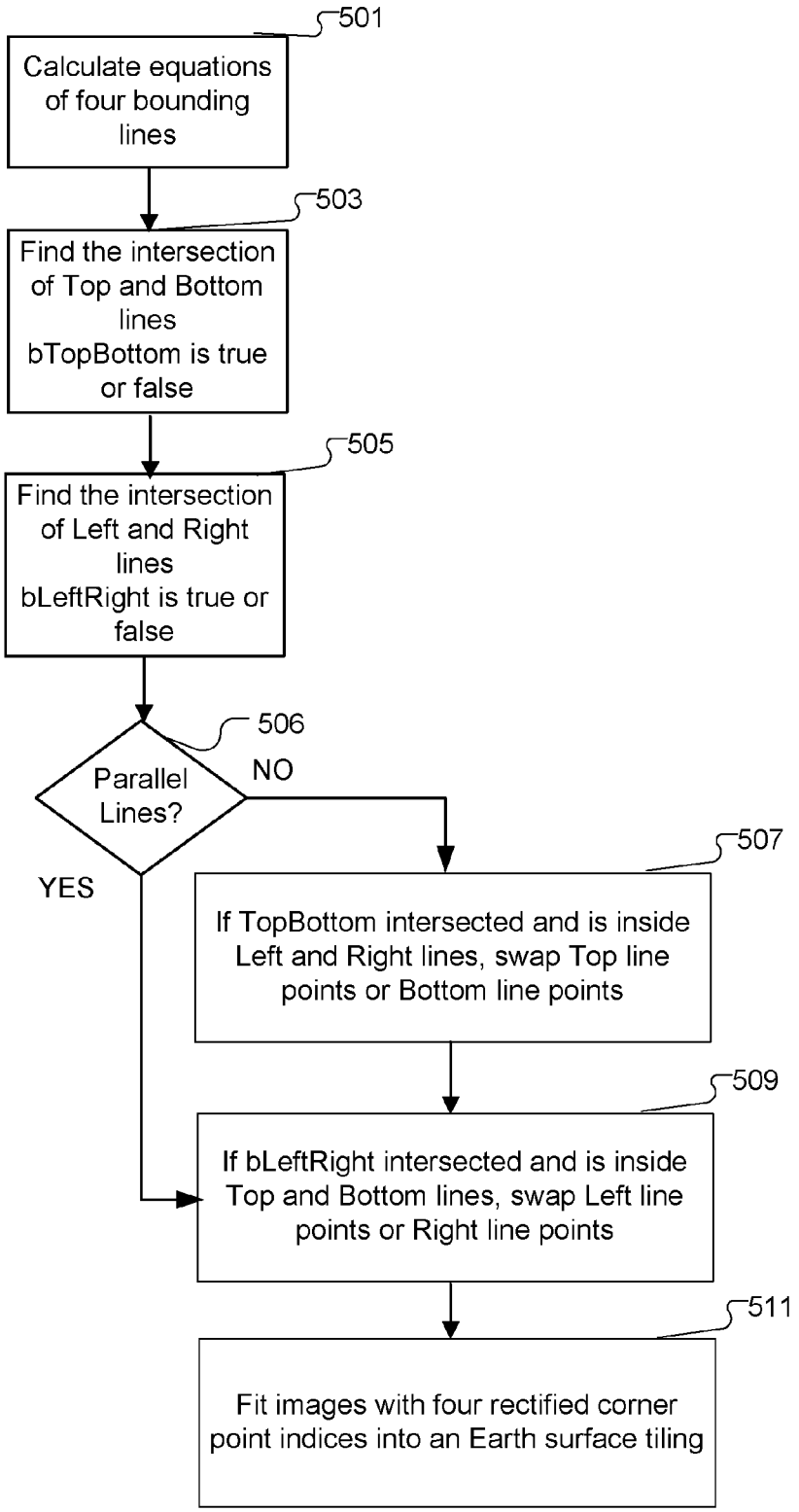
FIG. 5 is a flowchart depicting steps in the detection and correction of misordered corner points in accordance with an embodiment of the present invention.

The method that has been described is summarized in the flowchart shown in FIG. 5. In a first step 501, equations of the four bounding lines 301, 302, 303 and 304 (shown in FIG. 4A) are calculated. Then the intersection point A of the Top and Bottom lines is found (503), if it exists, with the existence represented by the Boolean value of the bTopBottom variable. Similarly, the intersection point B of the Right and Left lines is found (505), if it exists, with the existence represented by the Boolean value of the bLeftRight variable.

If the primary lines are parallel (506), then the test of intersection of the primary lines is bypassed. If bTopBottom is true and if the intersection point A is inside the Left and Right lines, then the corner points lying on the Top or Bottom lines respectively (otherwise referred to herein as the "Top" points and the "Bottom" points) are swapped (507). Mutatis mutandis, if the intersection point B is inside the Top and Bottom lines, then the corner points lying on the Left or Right lines respectively (otherwise referred to herein as the "Left" points and the "Right" points) are swapped (509). Once the corner point indices have been rectified, the corresponding bounded images are fit (511) into an Earth surface tiling, using standard processing methods.

The remaining question is the determination of which points to swap. The selection is a matter of design choice. Typically, any swapping error is consistent over a range of values of viewing parameters.

Using an arbitrary point swap selection, along with the slope intersection method described above, may advantageously minimize calculations and the time required to swap the points and it has an inherent built-in check to see whether the bowtie of FIG. 4B exists. To particular advantage, methods in accordance with the present invention are implemented without calling trigonometric functions. This feature provides an unexpected advantage over any other known methods of detecting and rectifying quadrilaterally bounded images within a data stream of motion imagery.

Figure 6A:
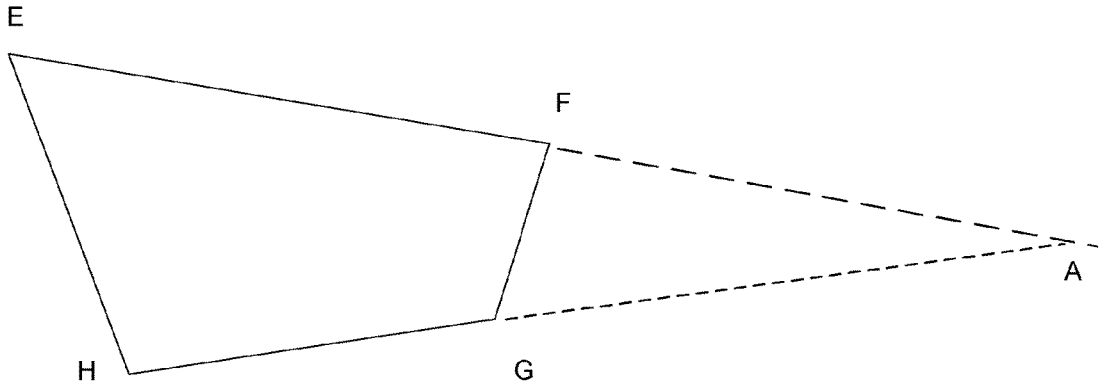
FIGS. 6A-6C show representative initial vertex orderings as instances of the application of an embodiment of the present invention.

Application of embodiments of the present invention in particular illustrative cases of initial vertex orderings is now described with reference to FIGS. 6A-6C. In FIG. 6A, top line $\overline{EF}$ and bottom line $\overline{GH}$ intersect in a point A outside quadrilateral $\overline{EFGH}$, the Remainder of which with respect to line $\overline{EH}$ is positive (it lies above line $\overline{EH}$, but the slope of line $\overline{EH}$ is negative, so the Signed Remainder of the intersection A of lines line $\overline{EF}$ and line $\overline{GH}$ with respect to line $\overline{EH}$ is negative. Similarly, the Remainder of the intersection of lines $\overline{EF}$ and line $\overline{GH}$ with respect to line $\overline{FG}$ is negative (it lies below line $\overline{FG}$). The slope of line $\overline{FG}$ is positive, thus the Signed Remainder of the intersection of lines line $\overline{EF}$ and line $\overline{GH}$ with respect to line $\overline{FG}$ is also negative. Since the Signed Remainders of the intersection A of lines of lines $\overline{EF}$ and line $\overline{GH}$ with respect to both of the secondary lines $\overline{EH}$ and line $\overline{FG}$ are negative, the intersection A lies outside quadrilateral $\overline{EFGH}$ and no swapping of indices is called for the primary lines. Similar considerations confirm that no swapping of indices is called for in the case of the secondary lines.

Figure 6B:
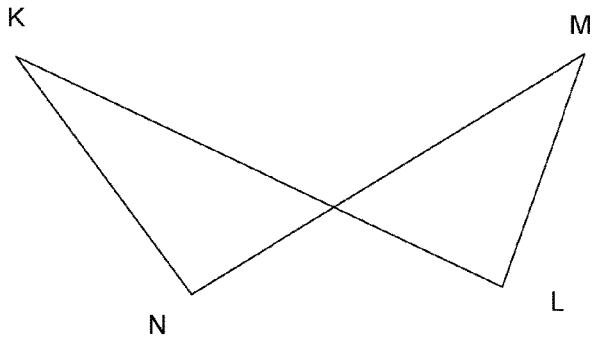
Figure 6C:
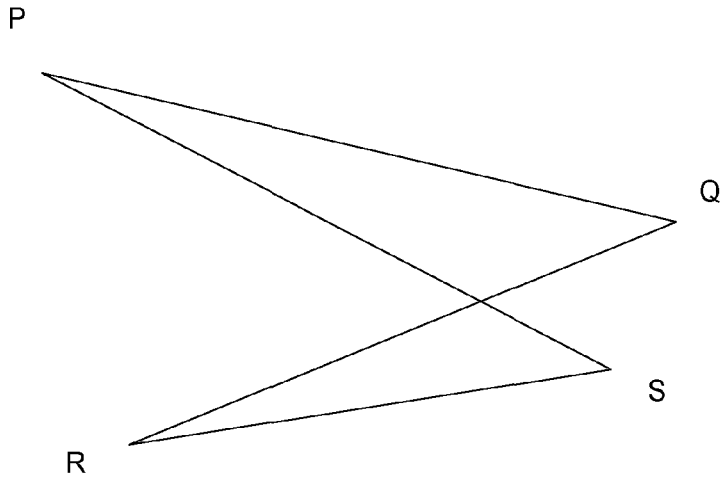

Analogous analyses, based on the method described herein, leads to the conclusion that quadrilateral $\overline{KLMN}$ shown in FIG. 6B and quadrilateral $\overline{PQRS}$ shown in FIG. 6C are bowties, and that vertices must be swapped, as called for by embodiments of the present invention.

The above described methods may be performed, and the above described systems may be implemented, by a computer system, including a processor, by executing appropriate instructions stored in a memory. A computer program product for rectifying images has been described with reference to a processor controlled by instructions stored in a memory. The memory may be random access memory (RAM), read-only memory (ROM), flash memory or any other memory, or combination thereof, suitable for storing control software or other instructions and data. Some of the functions performed by the transformation methods and apparatus have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on tangible non-transitory non-writable storage media (e.g. read-only memory devices within a computer, such as ROM, or devices readable by a computer I/O attachment, such as CD-ROM or DVD disks), information alterably stored on tangible non-transitory writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of the shadow estimation method have been described with reference to a flowchart, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiments.

An example of computer code that may be used to practice the computer-implemented method described herein is now provided.

© 2017 Intergraph Corporation

```
void CKLVParser0601::FixBowTie(double *pdGroundCorner1Lat, double
*pdGroundCorner1Long,
double *pdGroundCorner2Lat, double *pdGroundCorner2Long,
double *pdGroundCorner3Lat, double *pdGroundCorner3Long,
double *pdGroundCorner4Lat, double *pdGroundCorner4Long,
bool bSwapRight, bool bSwapBottom)
{
if (sNAN == *pdGroundCorner1Lat || sNAN == *pdGroundCorner1Long ||
        sNAN == *pdGroundCorner2Lat || sNAN == *pdGroundCorner2Long ||
            sNAN == *pdGroundCorner3Lat || sNAN == *pdGroundCorner3Long ||
            sNAN == *pdGroundCorner4Lat || sNAN == *pdGroundCorner4Long)
        {
            return;
        }
        // treat the lat long as points in a cartesian x,y graph
```

-continued

```
        // Determine the equation of the four line
        bool bABIntersect = false;
        bool bSwapped = false;
        // Line A from point 1 to point 2
        double dASlope = 0;
        double dASlopeSign = 1.0;
        double dAIntercept = 0;
        double dARun = *pdGroundCorner2Long - *pdGroundCorner1Long;
        double dARise = *pdGroundCorner2Lat - *pdGroundCorner1Lat;
        if (dARun != 0)
        {
            dASlope = dARise / dARun;
            if (dASlope < 0)
            {
                dASlopeSign = -1.0;
            }
            dAIntercept = *pdGroundCorner1Lat - dASlope * *pdGroundCorner1Long;
        }
        else
        {
            // A vertical line
            // Slope is infinite
            // Intercept is all vertical point at point x(1Long)
        }
    // Line B from point 4 to point 3
        double dYABIntersect = 0;
        double dXABIntersect = 0;
        double dBSlope = 0;
    double dBSlopeSign = 1.0;
    double dBIntercept = 0;
    double dBRun = *pdGroundCorner4Long - *pdGroundCorner3Long;
    double dBRise = *pdGroundCorner4Lat - *pdGroundCorner3Lat;
    if (dBRun != 0)
    {
        dBSlope = dBRise / dBRun;
        if (dBSlope < 0)
        {
            dBSlopeSign = -1.0;
        }
        dBIntercept = *pdGroundCorner3Lat - dBSlope * *pdGroundCorner3Long;
    }
    else
    {
        // A vertical line
        // Slope is infinite
        // Intercept is all vertical point at point x(1Long)
    }
    // See if the opposite lines intersect
    if (dBRun != 0 && dARun != 0)
    {
        // General case
        if (dBSlope != dASlope)
        {
            // They must intersect
            dXABIntersect = (dBIntercept - dAIntercept) / (dASlope - dBSlope);
            dYABIntersect = dASlope * ((dBIntercept - dAIntercept) / (dASlope -
dBSlope)) + dAIntercept;
            bABIntersect = true;
        }
        // Othewise they are coincident or parallel and do not intersect
    }
    else if (0 == dBRun && 0 == dARun)
    {
        // Both are vertical and are either coincident or do not itersect
        // Do nothing
    }
    else if (0 == dBRun && 0 != dARun)
    {
        // B id vertical and A sloped
        // B is the Long value or X
        dXABIntersect = *pdGroundCorner3Long;
        dYABIntersect = dASlope * dXABIntersect + dAIntercept;
        bABIntersect = true;
    }
    else
    {
        // A is vertical and B sloped
        // A is the Long value or X
        dXABIntersect = *pdGroundCorner1Long;
```

-continued

```
        dYABIntersect = dBSlope * dXABIntersect + dBIntercept;
        bABIntersect = true;
    }
    // Second set of lines
    bool bCDIntersect = false;
    // Line C from point 2 to point 3
    double dCSlope = 0;
    double dCSlopeSign = 1.0;
    double dCIntercept = 0;
    double dCRun = *pdGroundCorner3Long - *pdGroundCorner2Long;
    double dCRise = *pdGroundCorner3Lat - *pdGroundCorner2Lat;
    if (dCRun != 0)
    {
        dCSlope = dCRise / dCRun;
        if (dCSlope < 0)
        {
            dCSlopeSign = -1.0;
        }
        dCIntercept = *pdGroundCorner2Lat - dCSlope * *pdGroundCorner2Long;
    }
    // Else it is a vertical line
    // Slope is infinite
    // Intercept is all vertical point at point x(1Long)
    // Line D from point 4 to point 1
    double dYCDIntersect = 0;
    double dXCDIntersect = 0;
    double dDSlope = 0;
    double dDSlopeSign = 1.0;
    double dDIntercept = 0;
    double dDRun = *pdGroundCorner4Long - *pdGroundCorner1Long;
    double dDRise = *pdGroundCorner4Lat - *pdGroundCorner1Lat;
    if (dDRun != 0)
    {
        dDSlope = dDRise / dDRun;
        if (dDSlope < 0)
        {
            dDSlopeSign = -1.0;
        }
        dDIntercept = *pdGroundCorner4Lat - dDSlope * *pdGroundCorner4Long;
    }
    // Else it is a vertical line
    // Slope is infinite
    // Intercept is all vertical point at point x(1Long)
    // See if the opposite lines intersect
    if (dDRun != 0 && dCRun != 0)
    {
        // General case
        if (dDSlope != dCSlope)
        {
            // They must intersect
            dXCDIntersect = (dDIntercept - dCIntercept) / (dCSlope - dDSlope);
            dYCDIntersect = dCSlope * ((dDIntercept - dCIntercept) / (dCSlope -
dDSlope)) + dCIntercept;
            bCDIntersect = true;
        }
        // Othewise they are coincident or parallel and do not intersect
    }
    else if (0 == dDRun && 0 == dCRun)
    {
        // Both are vertical and are either coincident or do not itersect
        // Do nothing
    }
    else if (0 == dDRun && 0 != dCRun)
    {
        // D is vertical and C sloped
        // D is the Long value or X
        dXCDIntersect = *pdGroundCorner4Long;
        dYCDIntersect = dCSlope * dXCDIntersect + dCIntercept;
        bCDIntersect = true;
    }
    else
    {
        // C is vertical and D sloped
        // C is the Long value or X
        dXCDIntersect = *pdGroundCorner2Long;
        dYCDIntersect = dDSlope * dXCDIntersect + dDIntercept;
        bCDIntersect = true;
    }
    // Determine if the intersect point is inside the bounding rectangle. If so it is a bowtie
```

-continued

```
    if (bABIntersect)
    {
        // see if it is between lines C and D
        double dYC = (dCSlope * dXABIntersect + dCIntercept - dYABIntersect) *
dCSlopeSign;
        double dYD = (dDSlope * dXABIntersect + dDIntercept - dYABIntersect) *
dDSlopeSign;
        // If they have opposite signs, it is a bowtie
        if ((dYC >= 0 && dYD <= 0) || (dYC <= 0 && dYD >= 0))
        {
            // Swap points 2 and 3 or you could do 1 and 4
            if (bSwapRight)
            {
                double dLatTemp = *pdGroundCorner2Lat;
                double dLongTemp = *pdGroundCorner2Long;
                *pdGroundCorner2Lat = *pdGroundCorner3Lat;
                *pdGroundCorner2Long = *pdGroundCorner3Long;
                *pdGroundCorner3Lat = dLatTemp;
                *pdGroundCorner3Long = dLongTemp;
            }
            else
            {
                double dLatTemp = *pdGroundCorner4Lat;
                double dLongTemp = *pdGroundCorner4Long;
                *pdGroundCorner4Lat = *pdGroundCorner1Lat;
                *pdGroundCorner4Long = *pdGroundCorner1Long;
                *pdGroundCorner1Lat = dLatTemp;
                *pdGroundCorner1Long = dLongTemp;
            }
            dBSlope = 0;
            dBSlopeSign = 1.0;
            dBIntercept = 0;
            dBRun = *pdGroundCorner4Long - *pdGroundCorner3Long;
            dBRise = *pdGroundCorner4Lat - *pdGroundCorner3Lat;
            if (dBRun != 0)
            {
                dBSlope = dBRise / dBRun;
                if (dBSlope < 0)
                {
                    dBSlopeSign = -1.0;
                }
                dBIntercept = *pdGroundCorner3Lat - dBSlope *
*pdGroundCorner3Long;
            }
            else
            {
                // A vertical line
                // Slope is infinite
                // Intercept is all vertical point at point x(1Long)
            }
        }
    }
    if (bCDIntersect && !bSwapped)
    {
        // see if it is between lines A and B
        double dYA = (dASlope * dXCDIntersect + dAIntercept - dYCDIntersect) *
dASlopeSign;
        double dYB = (dBSlope * dXCDIntersect + dBIntercept - dYCDIntersect) *
dBSlopeSign;
        // If they have opposite signs, it is a bowtie
        if ((dYA >= 0 && dYB <= 0) || (dYA <= 0 && dYB >= 0))
        {
            // Swap points 3 and 4 or you could do 1 and 2
            if (bSwapBottom)
            {
                bSwapped = true;
                double dLatTemp = *pdGroundCorner3Lat;
                double dLongTemp = *pdGroundCorner3Long;
                *pdGroundCorner3Lat = *pdGroundCorner4Lat;
                *pdGroundCorner3Long = *pdGroundCorner4Long;
                *pdGroundCorner4Lat = dLatTemp;
                *pdGroundCorner4Long = dLongTemp;
            }
            else
            {
                double dLatTemp = *pdGroundCorner1Lat;
                double dLongTemp = *pdGroundCorner1Long;
                *pdGroundCorner1Lat = *pdGroundCorner2Lat;
                *pdGroundCorner1Long = *pdGroundCorner2Long;
```

-continued

```
                *pdGroundCorner2Lat = dLatTemp;
                *pdGroundCorner2Long = dLongTemp;
            }
        }
    }
}
```

What is claimed is:

1. A computer-implemented method for ordering vertices in a stream of image frames encapsulating Earth-viewing data, the computer-implemented method comprising:

a. receiving, in the stream of image frames, an image frame including four vertices of a terrestrial area, acquired by an optical sensor at an image plane of a remote sensing camera;

b. assigning a provisional index to each of the four vertices;

c. establishing a first point of intersection of *two* primary lines defined by pairwise ordered sets of vertices;

d. loading the first point of intersection into computer memory;

e. interrogating the first point of intersection as to a sign of a signed remainder with respect to each of two secondary lines defined by the pairwise ordered sets of vertices;

f. in the case of opposite remainder sign with respect to the two secondary lines, swapping a first and a second of the provisional indices to obtain a rectified index for each of the four vertices;

g. establishing a second point of intersection of [primary] *the two secondary* lines[defined by the pairwise ordered sets of vertices];

h. loading the second point of intersection into computer memory;

i. interrogating the second point of intersection as to a sign of a signed remainder with respect to each of the two primary lines defined by the pairwise ordered sets of vertices;

j. in the case of opposite remainder sign with respect to the two primary lines, swapping a second and a third of the provisional indices to obtain a rectified index for each of the four vertices, and otherwise using the provisional index of each of the four vertices as the rectified index of each of the four vertices; and k. fitting the four vertices into a tiling of the surface of the Earth based on the rectified indices of each of the four vertices.

2. The method according to claim 1, wherein the optical sensor of the remote sensing camera includes a rectangular array of pixels.

3. The method according to claim 1, wherein assigning a provisional index includes assigning vertex indices as received at a specified stage of processing the data stream.

4. The method according to claim 1, wherein establishing a point of intersection of primary lines includes simultaneous solution of two linear equations, wherein each linear equation characterizes a line passing through a distinct pair of vertices.

5. A computer program product for ordering vertices in a stream of image frames encapsulating Earth-viewing data, the computer program product comprising a non-transitory computer-readable medium on which are stored computer instructions such that, when executed by a processor, the instructions cause the processor to:

a. receive, in the stream of image frames, an image frame including four vertices of a terrestrial area, acquired by an optical sensor at an image plane of a remote sensing camera;

b. assign a provisional index to each of the four vertices;

c. establish a first point of intersection of *two* primary lines defined by pairwise ordered sets of vertices;

d. load the first point of intersection into computer memory;

e. interrogate the first point of intersection as to a sign of a signed remainder with respect to each of two secondary lines defined by the pairwise ordered sets of vertices;

f. in the case of opposite remainder sign with respect to the two secondary lines, swap a first and a second of the provisional indices to obtain a rectified index for each of the four vertices;

g. establish a second point of intersection of [primary] *the two secondary* lines[defined by pairwise ordered sets of vertices];

h. load the second point of intersection into computer memory;

i. interrogate the second point of intersection as to a sign of a signed remainder with respect to each of the two primary lines defined by the pairwise ordered sets of vertices;

j. in the case of opposite remainder sign with respect to the two primary lines, swap a second and a third of the provisional indices to obtain a rectified index for each of the four vertices, and otherwise use the provisional index of each of the four vertices as the rectified index of each of the four vertices; and k. fit the four vertices into a tiling of the surface of the Earth based on the rectified indices of each of the four vertices.

6. The computer program product according to claim 5, wherein the optical sensor of the remote sensing camera includes a rectangular array of pixels.

7. The computer program product according to claim 5, wherein assigning a provisional index includes assigning vertex indices as received at a specified stage of processing the data stream.

8. The computer program product according to claim 5, wherein establishing a point of intersection of primary lines includes simultaneous solution of two linear equations, wherein each linear equation characterizes a line passing through a distinct pair of vertices.

* * * * *